United States Patent
Kogure et al.

(10) Patent No.: US 12,240,390 B2
(45) Date of Patent: Mar. 4, 2025

(54) WIRE HARNESS

(71) Applicants: Yazaki Corporation, Tokyo (JP); AISIN CORPORATION, Aichi (JP)

(72) Inventors: Naoto Kogure, Shizuoka (JP); Hikaru Sano, Shizuoka (JP); Seiichi Sumiya, Aichi (JP)

(73) Assignees: YAZAKI CORPORATION, Tokyo (JP); AISIN CORPORATION, Aichi (JP)

( * ) Notice: Subject to any disclaimer, the term of this patent is extended or adjusted under 35 U.S.C. 154(b) by 230 days.

(21) Appl. No.: 18/175,060

(22) Filed: Feb. 27, 2023

(65) Prior Publication Data

US 2023/0271574 A1 Aug. 31, 2023

(30) Foreign Application Priority Data

Feb. 28, 2022 (JP) ................. 2022-028848

(51) Int. Cl.
*B60R 16/027* (2006.01)
*B60J 5/06* (2006.01)
*B60R 16/02* (2006.01)

(52) U.S. Cl.
CPC ........... *B60R 16/0215* (2013.01); *B60J 5/06* (2013.01); *B60R 16/027* (2013.01)

(58) Field of Classification Search
CPC .................................................... H02G 11/00
See application file for complete search history.

(56) References Cited

U.S. PATENT DOCUMENTS

| | | | |
|---|---|---|---|
| 2005/0095903 A1* | 5/2005 | Stenzel | H02G 3/0475 439/501 |
| 2007/0148992 A1* | 6/2007 | Sato | B60R 16/0207 439/34 |
| 2007/0148994 A1* | 6/2007 | Sato | B60R 16/0215 439/34 |
| 2013/0214099 A1* | 8/2013 | Okumura | F16L 3/015 248/74.3 |
| 2015/0203057 A1 | 7/2015 | Terada et al. | |
| 2021/0016725 A1 | 1/2021 | Yamashita et al. | |

FOREIGN PATENT DOCUMENTS

| | | |
|---|---|---|
| DE | 10 2006 061 641 A1 | 7/2007 |
| JP | 10-175483 A | 6/1998 |
| JP | 2021-019386 A | 2/2021 |

* cited by examiner

*Primary Examiner* — Paresh Paghadal
(74) *Attorney, Agent, or Firm* — Sughrue Mion, PLLC

(57) ABSTRACT

A harness body (10) is guided to a fixed portion (522) on a side of a slide door (520) by a harness guide tool (40) at an other end portion (612) of a first arm member (610) on a side of a vehicle body (510) and includes a third routing portion (13) having a fixing portion (13*a*) fixed to the fixed portion, a link mechanism (600) includes a second arm member (620) on the side of the slide door coupled to the other end portion of the first arm member via a second rotation shaft (641), and the third routing portion is twisted and deformed about its own axis between the harness guide tool and the fixing portion when the first arm member and the second arm member are relatively rotated with respect to each other.

4 Claims, 11 Drawing Sheets

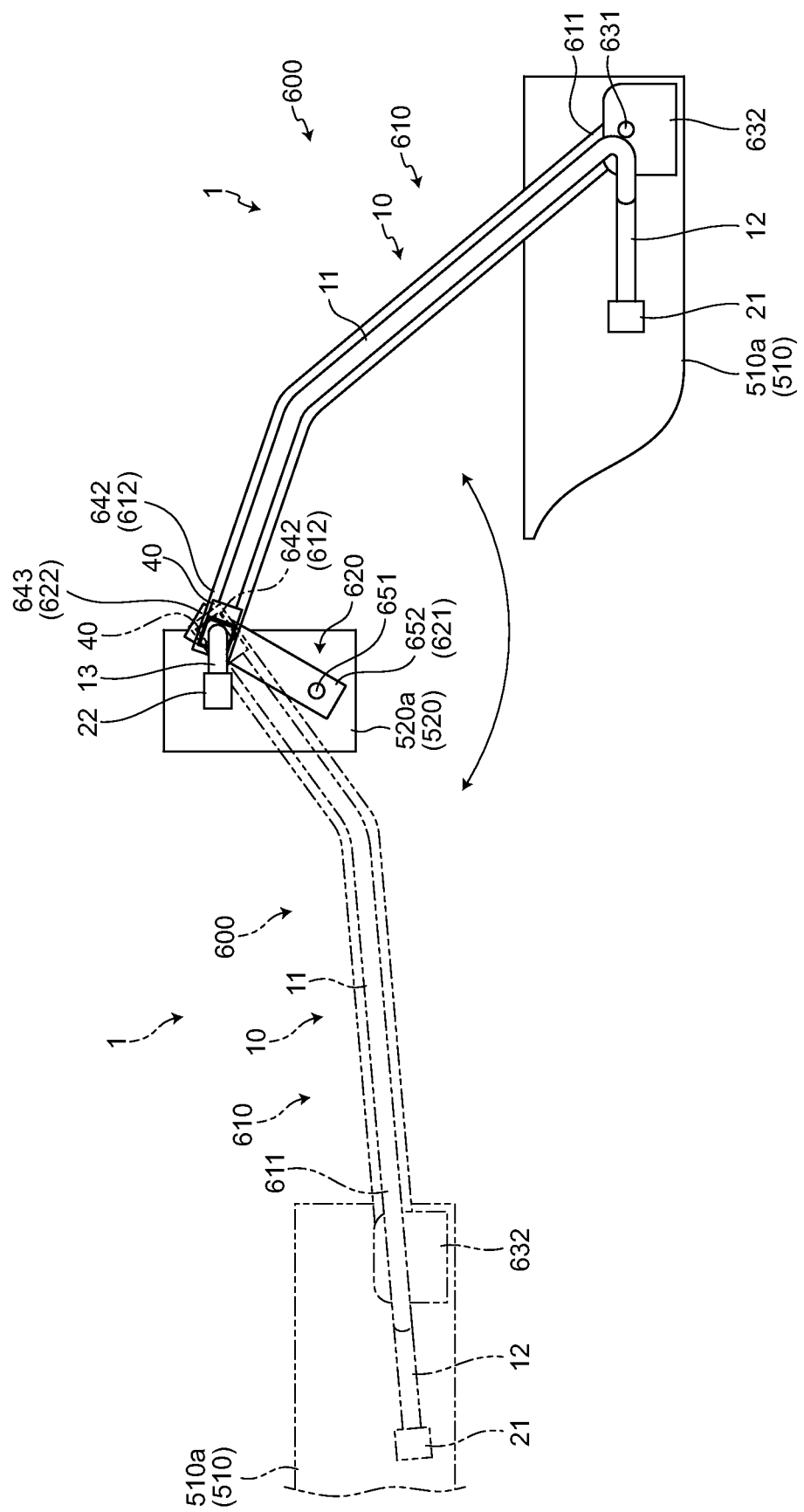

WIRE HARNESS

CROSS-REFERENCE TO RELATED APPLICATION(S)

The present application claims priority to and incorporates by reference the entire contents of Japanese Patent Application No. 2022-028848 filed in Japan on Feb. 28, 2022.

BACKGROUND OF THE INVENTION

1. Field of the Invention

The present invention relates to a wire harness.

2. Description of the Related Art

Conventionally, a vehicle such as an automobile is mounted with a wire harness that electrically connects a power source (secondary battery and the like) on a vehicle body side, an electrical component, and the like to a switch on a slide door side, an electrical component, and the like. In this wire harness, the harness body is routed between the vehicle body and the slide door, and the routing path of the harness body changes in conjunction with the opening/closing operation of the slide door. This type of wire harness is disclosed in, for example, Japanese Patent Application Laid-open No. 2021-19386 below.

In the vehicle, a slide mechanism responsible for a sliding operation of the slide door is assembled between the slide door and the vehicle body. For example, in a vehicle, it is conceivable to use a link mechanism passed between a slide door and a vehicle body as the slide mechanism. Then, in this vehicle, it is conceivable to route the harness body along the link mechanism. In this case, in the wire harness, the harness body follows the movement of the link mechanism, but it is not preferable that an overload is applied to the harness body due to excessive bending and the like.

SUMMARY OF THE INVENTION

Therefore, an object of the present invention is to provide a wire harness capable of causing the harness body to follow the movement of the link mechanism without overload.

In order to achieve the above mentioned object, a wire harness according to one aspect of the present invention includes a harness body having a first routing portion routed in a link mechanism that couples a vehicle body and a slide door and reciprocates the slide door in a sliding direction with respect to the vehicle body, a second routing portion routed closer to a side of the vehicle body than the first routing portion, and a third routing portion routed closer to a side of the slide door than the first routing portion; a harness fixing tool that fixes a fixing portion of the third routing portion to a fixed portion on the side of the slide door provided not to cause relative displacement with respect to the slide door; and a harness guide tool that regulates a routing path of the third routing portion, wherein the link mechanism includes a first arm member having one end portion coupled to the side of the vehicle body and the first routing portion routed to an other end portion, a second arm member having one end portion connected to the side of the slide door, a first rotation shaft having a direction orthogonal to the sliding direction as an axial direction and capable of first relative rotation between the vehicle body and the one end portion of the first arm member, a second rotation shaft parallel to the first rotation shaft and capable of second relative rotation between the other end portion of the first arm member to which the harness guide tool is fixed and an other end portion of the second arm member, and a third rotation shaft parallel to the first rotation shaft and the second rotation shaft and capable of third relative rotation between the slide door and the one end portion of the second arm member, in which the slide door reciprocates in the sliding direction with respect to the vehicle body along a plane orthogonal to the first rotation shaft, the second rotation shaft, and the third rotation shaft, the harness guide tool guides the third routing portion toward the fixed portion on the side of the slide door positioned in a direction intersecting the orthogonal plane with respect to the harness guide tool, and the third routing portion is bent and deformed between the harness guide tool and the fixing portion when the second arm member is relatively rotated about an axis of the third rotation shaft with respect to the slide door, and is twisted and deformed about its own axis between the harness guide tool and the fixing portion when the first arm member and the second arm member are relatively rotated about an axis of the second rotation shaft with respect to each other.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 1 is a perspective view of a wire harness of an embodiment when a door is fully closed as viewed from a vehicle interior side together with a link mechanism, a slide door, and the like;

FIG. 2 is a perspective view of the wire harness of the embodiment when the door is fully closed as viewed from the vehicle interior side together with the link mechanism and the like;

FIG. 3 is a plan view of the wire harness of the embodiment when the door is fully closed as viewed from an upper side of a vehicle together with the link mechanism and the like;

FIG. 4 is a plan view of the wire harness of the embodiment when the door is fully closed as viewed from the vehicle interior side together with the link mechanism and the like;

FIG. 5 is a perspective view of the wire harness of the embodiment when the door is fully opened as viewed from the vehicle interior side together with the link mechanism and the like;

FIG. 6 is a plan view of the wire harness of the embodiment when the door is fully opened as viewed from the upper side of the vehicle together with the link mechanism and the like;

FIG. 7 is a perspective view of the wire harness of the embodiment when the door is half-opened as viewed from the vehicle interior side together with the link mechanism and the like;

FIG. 8 is a plan view of the wire harness of the embodiment when the door is half-opened as viewed from the upper side of the vehicle together with the link mechanism and the like;

FIG. 11 is a plan view of displacement of the wire harness and the link mechanism when the slide door at the half-opened position is moved to the fully opened position or made a reverse movement when viewed from the upper side of the vehicle from the viewpoint on the slide door side.

DETAILED DESCRIPTION OF THE PREFERRED EMBODIMENTS

Figure 1:
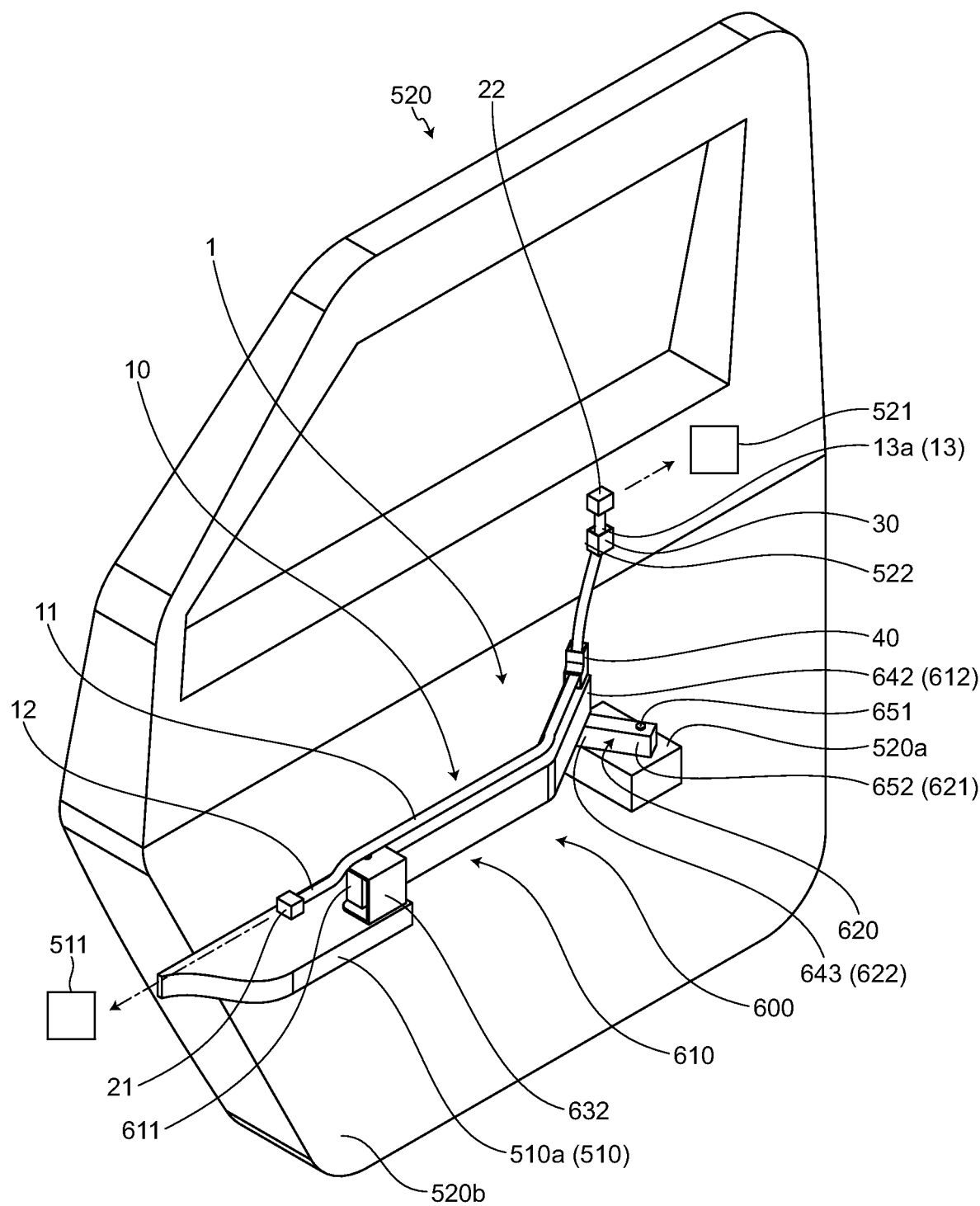

Hereinafter, an embodiment of a wire harness according to the present invention will be described in detail with reference to the drawings. Note that the present invention is not limited by the embodiment.

EMBODIMENT

One embodiment of a wire harness according to the present invention will be described with reference to FIGS. 1 to 11.

Reference numeral 1 in FIGS. 1 to 11 denotes a wire harness of the present embodiment.

For example, in a vehicle such as an automobile, a slide door 520 (FIGS. 1 to 11) capable of reciprocating in a sliding direction with respect to a vehicle body 510 is mounted. The vehicle includes a link mechanism 600 that couples the vehicle body 510 and the slide door 520 and reciprocates the slide door 520 in the sliding direction with respect to the vehicle body 510 in order to take charge of the sliding operation (reciprocating operation in the sliding direction) of the slide door 520 (FIGS. 1 to 11). The link mechanism 600 illustrated here slides the slide door 520 on the vehicle side in the vehicle front-rear direction.

Figure 4:
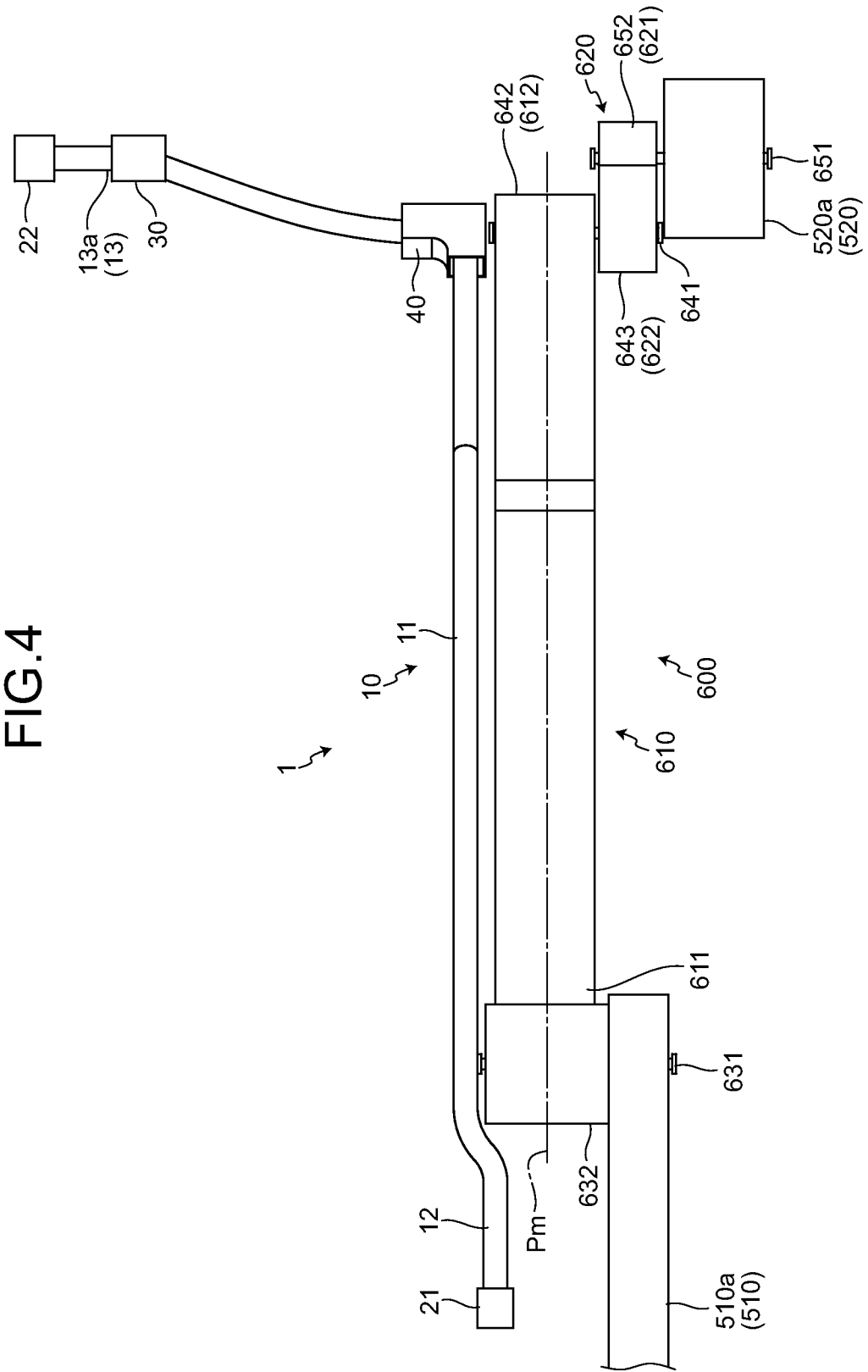
Figure 5:
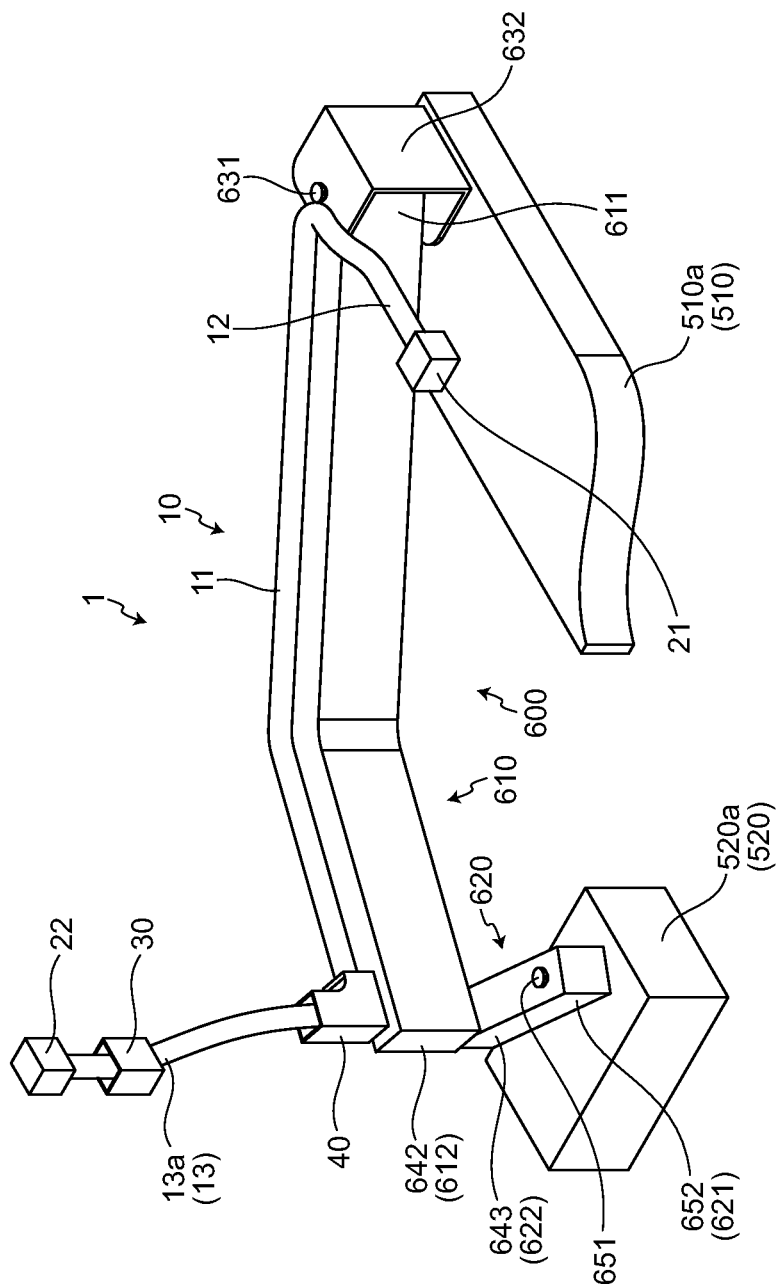
Figure 6:
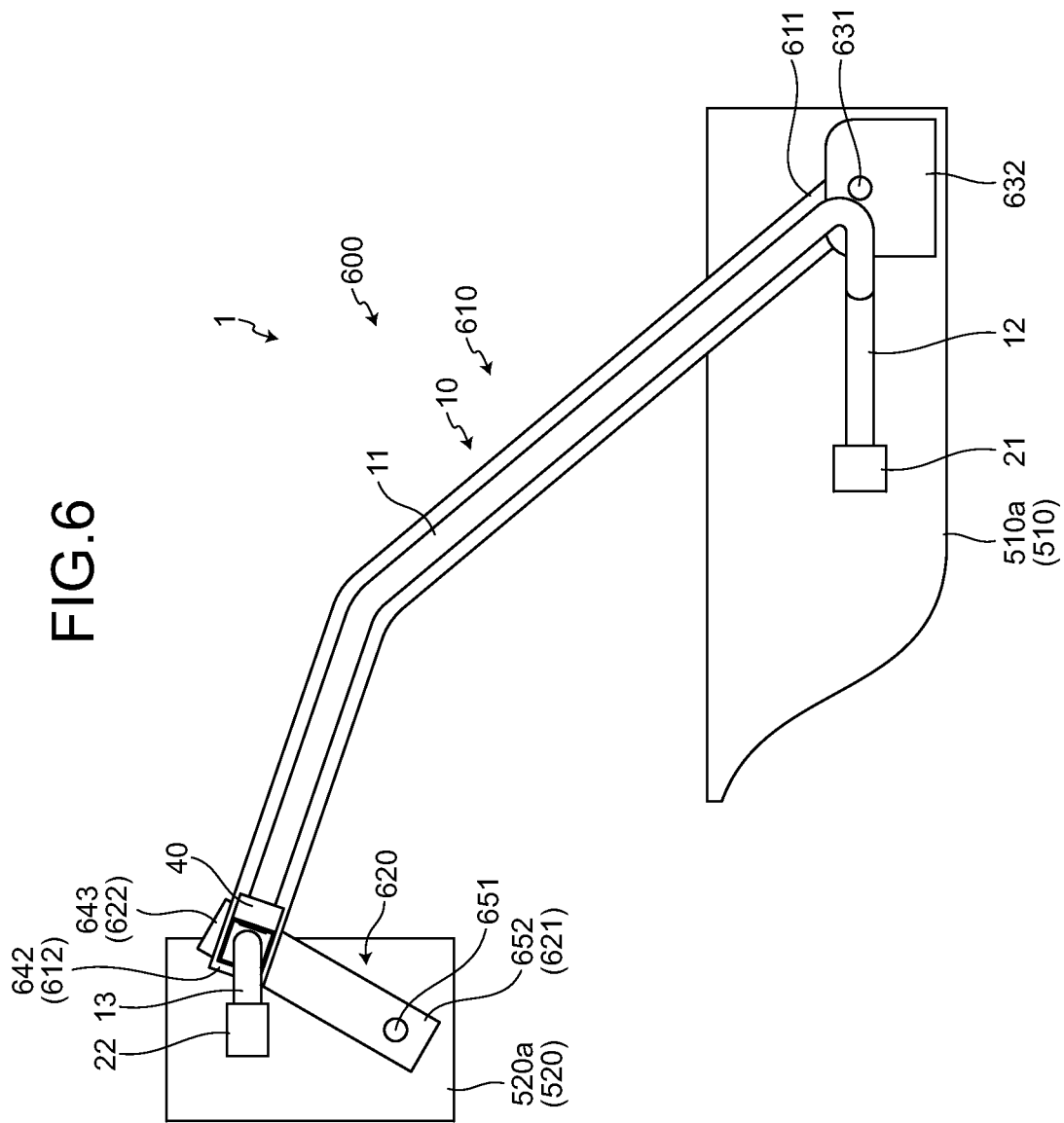
Figure 7:
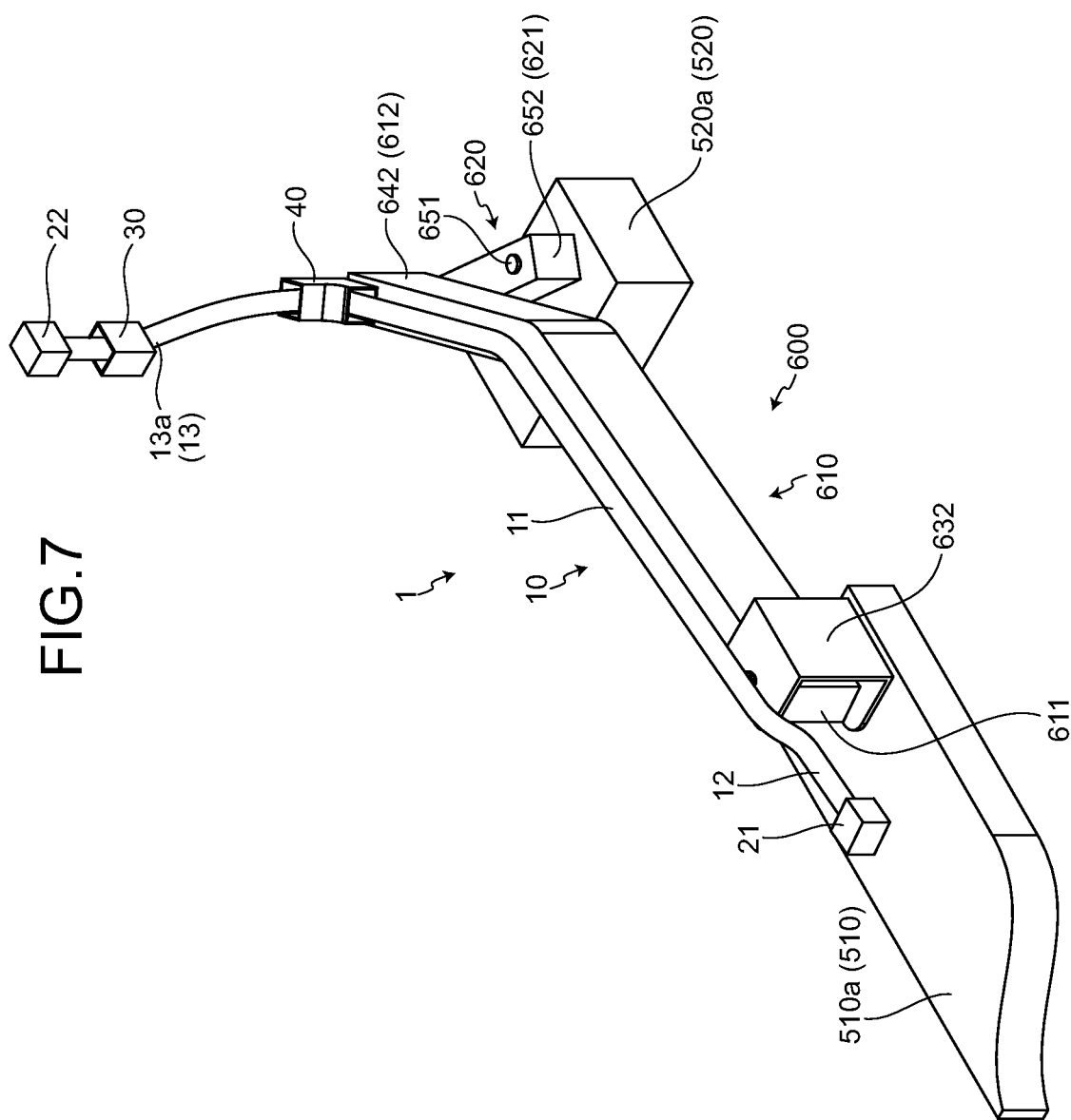
Figure 8:
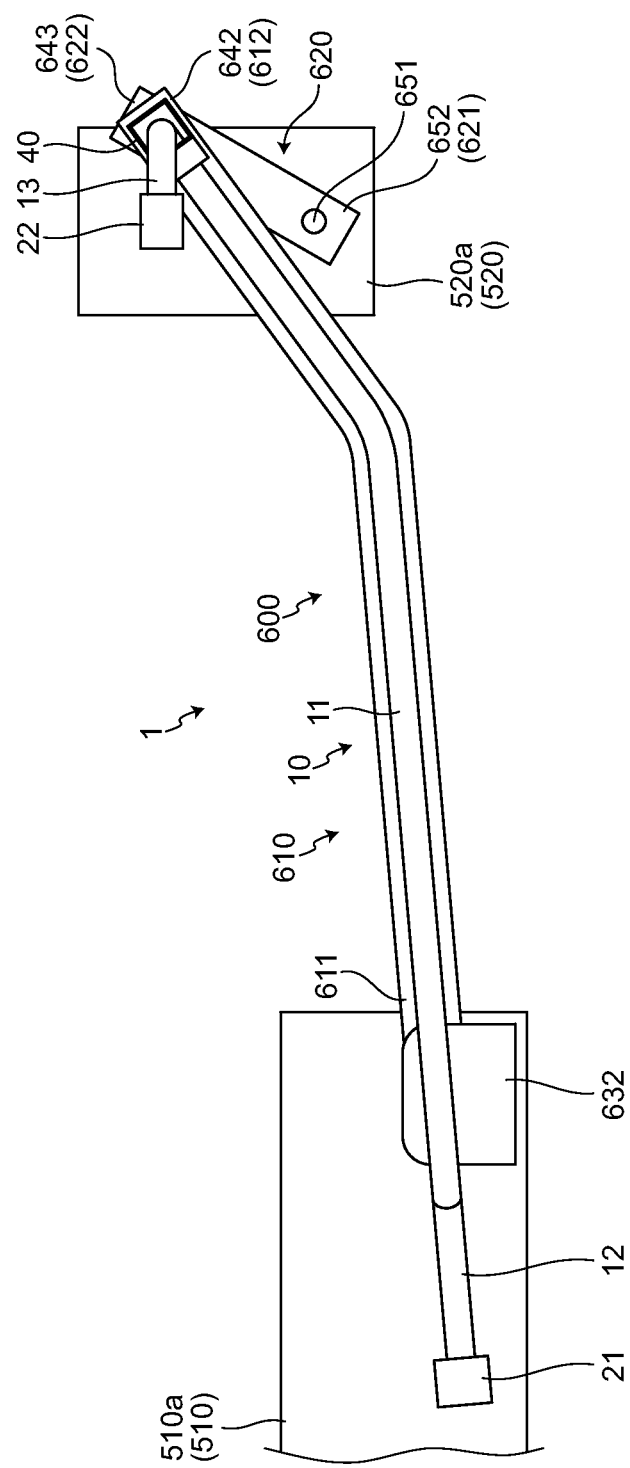

The link mechanism 600 passes between the vehicle body 510 and the slide door 520 to displace the slide door 520 with respect to the vehicle body 510 between a fully closed position (FIGS. 1 to 4) and a fully opened position (FIGS. 5 and 6). The link mechanism 600 is displaced with respect to the vehicle body 510 between a fully closed position and a fully opened position through a predetermined half-opened position (FIGS. 7 and 8) of the slide door 520. The link mechanism 600 includes a first arm member 610 that couples one end portion 611 to the side of the vehicle body 510, and a second arm member 620 that couples one end portion 621 to the side of the slide door 520 (FIGS. 1 to 11).

Furthermore, the link mechanism 600 includes a first rotation shaft 631 that enables first relative rotation between the vehicle body 510 and the one end portion 611 of the first arm member 610, a second rotation shaft 641 that is parallel to the first rotation shaft 631 and enables second relative rotation between an other end portion 612 of the first arm member 610 and an other end portion 622 of the second arm member 620, and a third rotation shaft 651 that is parallel to the first rotation shaft 631 and the second rotation shaft 641 and enables third relative rotation between the slide door 520 and the one end portion 621 of the second arm member 620 (FIGS. 1 to 11). The first rotation shaft 631, the second rotation shaft 641, and the third rotation shaft 651 each have an axial direction orthogonal to the sliding direction. In each of the first rotation shaft 631, the second rotation shaft 641, and the third rotation shaft 651 illustrated here, the axial direction is a direction orthogonal to the sliding direction (vehicle front-rear direction) and the vehicle width direction (that is, the vehicle up-down direction).

Figure 10:
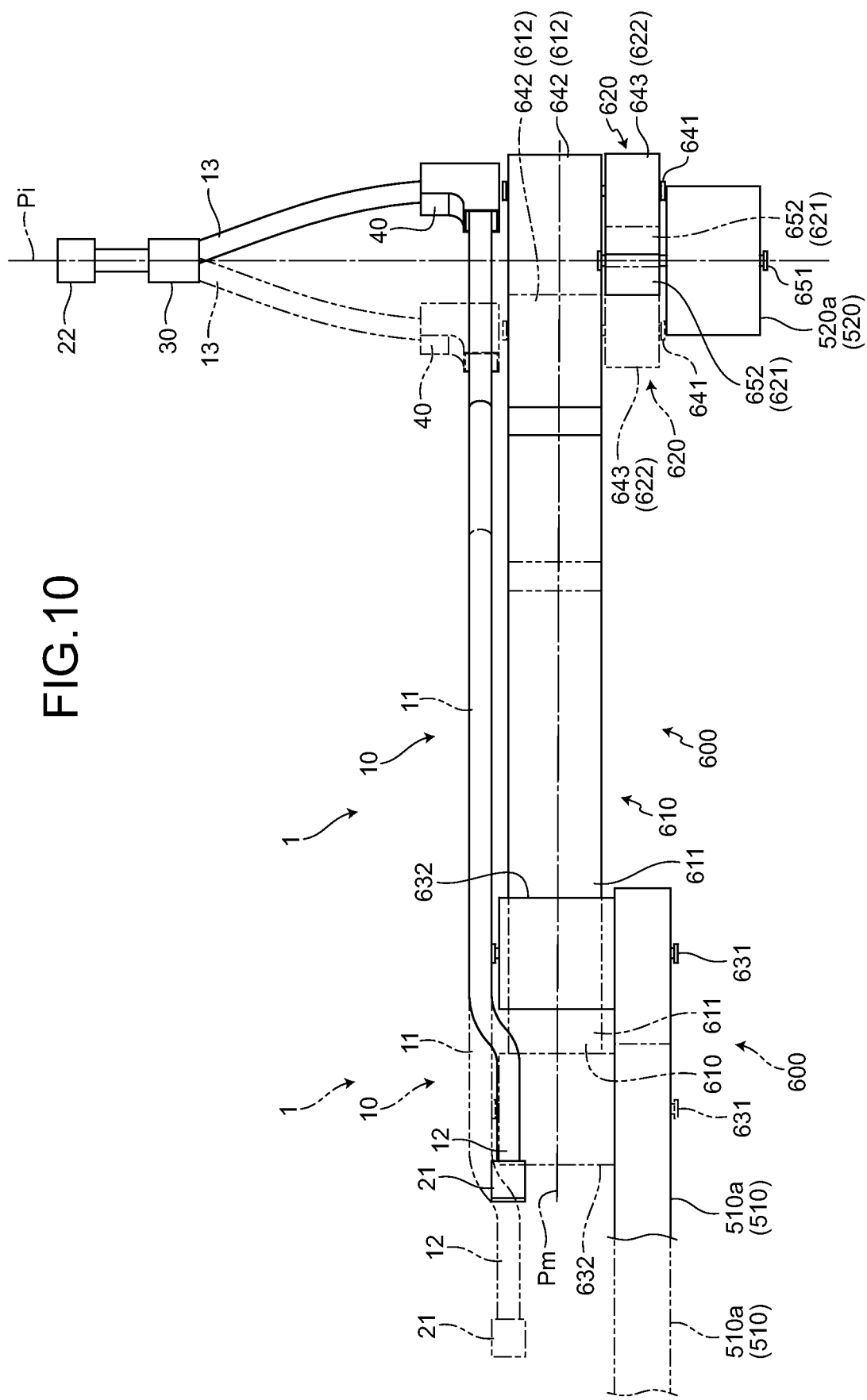
FIG. 10 is a plan view of the displacement of the wire harness and the link mechanism when the slide door at the fully closed position is moved to the half-opened position or made a reverse movement when viewed from the vehicle interior side from the viewpoint on the slide door side.

The link mechanism 600 reciprocates the slide door 520 in the sliding direction with respect to the vehicle body 510 along a plane (hereinafter, referred to as an "operation plane of the link mechanism 600") Pm orthogonal to the first rotation shaft 631, the second rotation shaft 641, and the third rotation shaft 651 (FIGS. 4 and 10).

In the link mechanism 600, output torque of a rotary machine (not illustrated) as a drive source is transmitted to the first rotation shaft 631.

For example, the first rotation shaft 631 illustrated here is fixed to the one end portion 611 of the first arm member 610 without relative displacement, and is operated integrally with the first arm member 610. Then, the link mechanism 600 illustrated here includes a bearing member 632 that is fixed to the vehicle body 510 and rotatably supports the first rotation shaft 631 (FIGS. 1 to 11). The bearing member 632 is a vehicle body side fixing member fixed to the vehicle body 510 without relative displacement. In the link mechanism 600, the first rotation shaft 631 and the bearing member 632 are provided as coupling members that couple a fixed portion 510a of the vehicle body 510 and the one end portion 611 of the first arm member 610 to be relatively rotatable with respect to each other. Therefore, the link mechanism 600 can relatively rotate the first arm member 610 about the axis of the first rotation shaft 631 with respect to the fixed portion 510a of the vehicle body 510.

In addition, for example, in the link mechanism 600 illustrated here, a bearing portion 642 rotatably supporting the second rotation shaft 641 is provided at the other end portion 612 of the first arm member 610 (FIGS. 1 to 11). Then, in the link mechanism 600 illustrated here, a bearing portion 643 rotatably supporting the second rotation shaft 641 is provided at the other end portion 622 of the second arm member 620 (FIGS. 1 to 11). Therefore, the first arm member 610 and the second arm member 620 are coupled via the second rotation shaft 641, the bearing portion 642, and the bearing portion 643 to be relatively rotatable about the axis of the second rotation shaft 641 with respect to each other. Note that, in the link mechanism 600, the second rotation shaft 641 may be fixed to one of the other end portion 612 of the first arm member 610 and the other end portion 622 of the second arm member 620 without relative displacement.

The third rotation shaft 651 is supported by a bearing portion provided on at least one of the one end portion 621 of the second arm member 620 and a fixed portion 520a of the slide door 520. For example, in the link mechanism 600 illustrated here, a bearing portion 652 rotatably supporting the third rotation shaft 651 is provided at the one end portion 621 of the second arm member 620 (FIGS. 1 to 11). Then, the fixed portion 520a of the slide door 520 illustrated here is formed as a bearing portion that rotatably supports the third rotation shaft 651. Therefore, the second arm member 620 and the slide door 520 are coupled via the third rotation shaft 651, the bearing portion 652, and the fixed portion 520a to be relatively rotatable about the axis of the third rotation shaft 651 with respect to each other.

The first arm member 610 illustrated here is arranged in a state of extending in the sliding direction (vehicle front-rear direction) when the slide door 520 is at the fully closed position (FIGS. 1 to 4). Then, when the slide door 520 at the fully closed position is opened, the link mechanism 600 relatively rotates the first arm member 610 with respect to the vehicle body 510 about the axis of the first rotation shaft 631 toward the vehicle exterior side (FIGS. 1 to 11).

Figure 9:
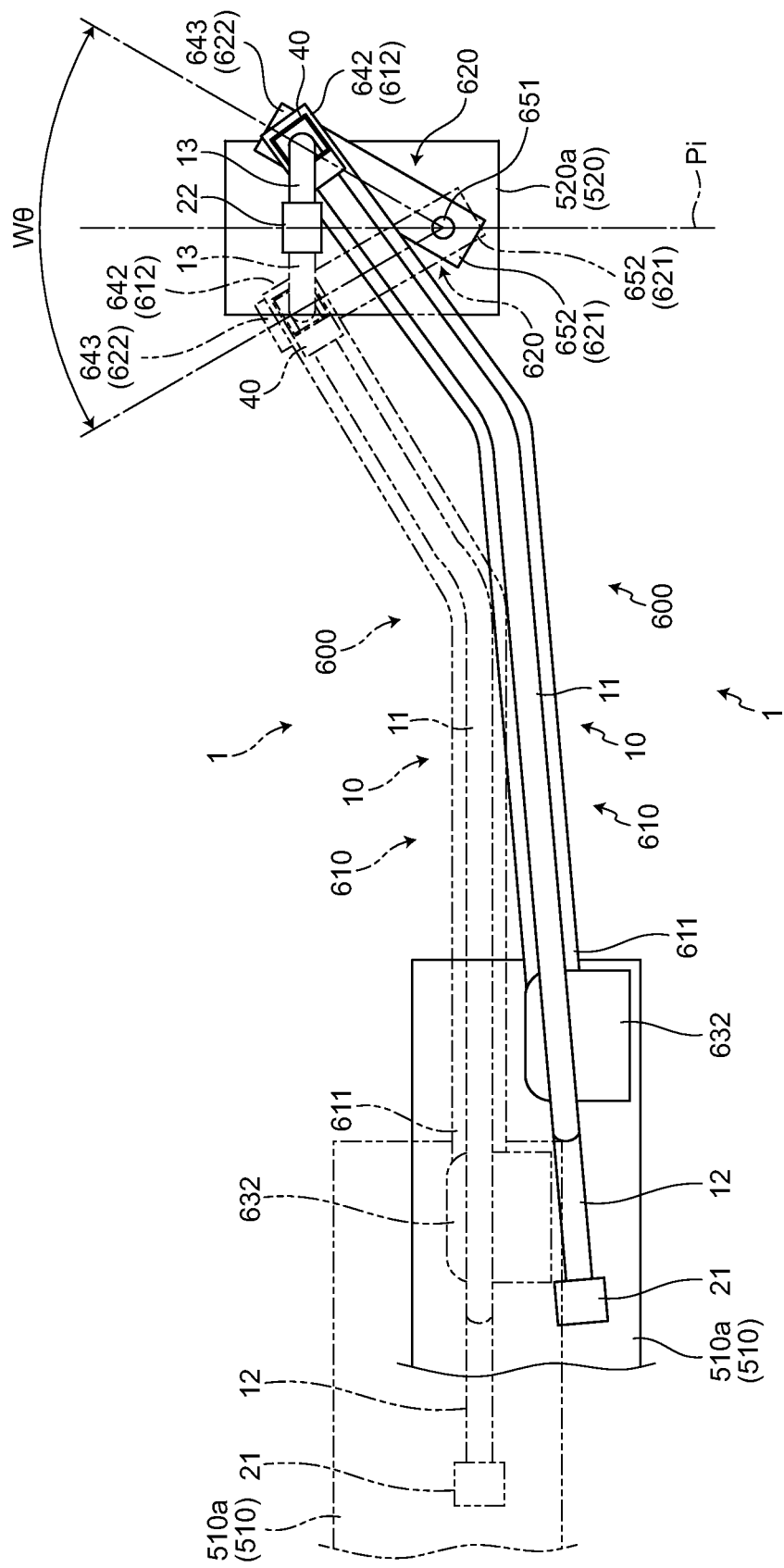
FIG. 9 is a plan view of displacement of the wire harness and the link mechanism when the slide door at the fully closed position is moved to the half-opened position or made a reverse movement when viewed from the upper side of the vehicle from a viewpoint on the slide door side.

In addition, the second arm member 620 illustrated here extends toward the vehicle interior side with respect to the second rotation shaft 641 regardless of the position of the slide door 520, and supports the third rotation shaft 651 at a position where the second arm member 620 extends. That is, the third rotation shaft 651 illustrated here is arranged on the vehicle interior side with respect to the second rotation shaft 641 regardless of the position of the slide door 520. Therefore, the fixed portion 520a of the slide door 520 protrudes from, for example, an inner panel 520b of the slide door 520 to the vehicle interior side with respect to the second rotation shaft 641, and the third rotation shaft 651 is supported at the protrusion. The link mechanism 600 relatively rotates the second arm member 620 about the axis of the third rotation shaft 651 with respect to the slide door 520 within the range of a swing width Wθ of the third relative rotation (FIG. 9).

The link mechanism 600 arranges the second arm member 620 at one end of the swing width WO of the third relative rotation when the slide door 520 is at the fully closed position (FIGS. 1 to 4, 9, and 10), and arranges the second arm member 620 at the other end of the swing width Wθ of the third relative rotation when the slide door 520 is at the fully opened position (FIGS. 5, 6, and 11).

The link mechanism 600 displaces the second arm member 620 from one end to the other end of the swing width Wθ of the third relative rotation when the slide door 520 is displaced from the fully closed position to the predetermined half-open position, and displaces the second arm member 620 from the other end to the one end of the swing width Wθ of the third relative rotation when the slide door 520 is displaced from the half-open position to the fully closed position (FIGS. 1 to 4 and 7 to 10). For example, when the slide door 520 at the fully closed position is moved to the fully opened position, the link mechanism 600 relatively rotates the first arm member 610 about the axis of the first rotation shaft 631 with respect to the vehicle body 510, and relatively rotates the second arm member 620 positioned at one end of the swing width we of the third relative rotation with respect to the slide door 520 about the axis of the third rotation shaft 651 with respect to the slide door 520 while relatively rotating the second arm member 620 about the axis of the second rotation shaft 641 with respect to the first arm member 610 in a manner that the second arm member 620 reaches the other end of the swing width wo of the third relative rotation with respect to the slide door 520. By operating the link mechanism 600 in this manner, the slide door 520 at the fully closed position is moved to a predetermined half-opened position. Note that the predetermined half-opened position of the slide door 520 herein refers to the position of the slide door 520 with respect to the vehicle body 510 when the second arm member 620 is displaced from one end to the other end of the swing width wo of the third relative rotation.

Subsequently, while continuing the relative rotation of the first arm member about the axis of the first rotation shaft 631 with respect to the vehicle body 510, the link mechanism 600 relatively rotates the first arm member 610 about the axis of the second rotation shaft 641 with respect to the second arm member 620 while keeping the second arm member 620 positioned at the other end of the swing width Wθ of the third relative rotation with respect to the slide door 520 (FIGS. 5 to 8 and 11). That is, when the slide door 520 is positioned between the predetermined half-opened position and the fully opened position, the link mechanism 600 keeps the second arm member 620 arranged at the other end of the swing width wo of the third relative rotation. By operating the link mechanism 600 in this manner, the slide door 520 at the predetermined half-opened position is moved to the fully opened position.

On the other hand, when the slide door 520 at the fully opened position is moved to the fully closed position, the link mechanism 600 relatively rotates the first arm member 610 about the axis of the first rotation shaft 631 (in the direction opposite to the opening operation) with respect to the vehicle body 510, and relatively rotates the first arm member 610 about the axis of the second rotation shaft 641 (in the direction opposite to the opening operation) with respect to the second arm member 620 while keeping the second arm member 620 positioned at the other end of the swing width Wθ of the third relative rotation with respect to the slide door 520 (FIGS. 5 to 8 and 11). By operating the link mechanism 600 in this manner, the slide door 520 at the fully opened position is moved to the predetermined half-opened position.

Subsequently, the link mechanism 600 continues to relatively rotate the first arm member about the axis of the first rotation shaft 631 with respect to the vehicle body 510, and relatively rotates the second arm member 620 positioned at the other end of the swing width wo of the third relative rotation with respect to the slide door 520 about the axis of the third rotation shaft 651 (in the direction opposite to the opening operation) with respect to the slide door 520 while relatively rotating the second arm member 620 about the axis of the second rotation shaft 641 (in the direction opposite to the opening operation) with respect to the first arm member 610 in a manner that the second arm member 620 reaches one end of the swing width Wθ with respect to the slide door 520 (FIGS. 1 to 4 and 7 to 10). By operating the link mechanism 600 in this manner, the slide door 520 at the half-opened position is moved to a predetermined fully closed position.

A wire harness 1 of the present embodiment is mounted on a vehicle in order to electrically connect a first electrical connection target 511 installed on the vehicle body 510 and a second electrical connection target 521 installed on the slide door 520 (FIG. 1).

The first electrical connection target 511 is installed on the side of the vehicle body 510 such as a power source (secondary battery and the like) or an electrical component. For example, the electrical component on the side of the vehicle body 510 indicates an acoustic device related to a speaker of the slide door 520, a drive device that drives a power seat, and the like. On the other hand, the second electrical connection target 521 is installed on the slide door 520 such as an electrical component and a switch. For example, the electrical components of the slide door 520 indicate a drive device that drives a power window, a speaker, and the like. In addition, the switch of the slide door 520 indicates a switch for operating a power window, a switch for operating a power seat, and the like.

The wire harness 1 is routed between the first electrical connection target 511 and the second electrical connection target 521 (FIG. 1). Then, the wire harness 1 is routed in the link mechanism 600 to follow the movement of the link mechanism 600.

The wire harness 1 includes a harness body 10 as a routing component that electrically connects the first electrical connection target 511 and the second electrical connection target 521 (FIGS. 1 to 11). The harness body 10 may be formed of only an electric wire bundle obtained by bundling a plurality of electric wires, the entire electric wire bundle may be covered with an exterior component such as a corrugated tube, or the electric wire bundle may be partially covered with one or a plurality of exterior components. In addition, the wire harness 1 may include a communication line for exchanging signals between the side of the vehicle body 510 and the side of the slide door 520.

In the wire harness 1, one terminal of the harness body 10 is electrically connected directly or indirectly to the first electrical connection target 511, and the other terminal of the harness body 10 is electrically connected directly or indirectly to the second electrical connection target 521. For example, the wire harness 1 includes a first connector 21 that is assembled to one terminal of the harness body 10 and electrically connects the harness body 10 to the first electrical connection target 511 directly or indirectly, and a second connector 22 that is assembled to the other terminal of the harness body 10 and electrically connects the harness body 10 to the second electrical connection target 521 directly or indirectly (FIGS. 1 to 11).

The harness body 10 includes a first routing portion 11 routed in the link mechanism 600, a second routing portion 12 routed closer to the side of the vehicle body 510 than the first routing portion 11, and a third routing portion 13 routed closer to the side of the slide door 520 than the first routing portion 11 (FIGS. 1 to 11).

The first routing portion 11 is routed to the other end portion 612 of the first arm member 610 (FIGS. 1 to 11). For example, the first routing portion 11 is routed to the other end portion 612 of the first arm member 610 along the first arm member 610. The first routing portion 11 illustrated here is disposed along the first arm member 610 over between the one end portion 611 and the other end portion 612. The first routing portion 11 may be fixed to the first arm member 610 at its one end portion 611 using a harness fixing tool (hereinafter, referred to as an "arm-side fixing tool") (not illustrated), and may not be fixed at such one end portion 611. Note that the arm-side fixing tool is, for example, a clamp or a clip provided with respective holding shapes with respect to the first routing portion 11 and the first arm member 610 (for example, a portion formed in a flat plate shape), a resin tape that winds the first routing portion 11 and the first arm member 610 together, and the like.

The second routing portion 12 is, for example, a portion routed closer to the side of the vehicle body 510 than the one end portion 611 in a case where the first routing portion 11 is routed between the one end portion 611 and the other end portion 612 of the first arm member 610 in the harness body 10 (FIGS. 1 to 11). In the harness body 10, the first connector 21 of the terminal of the second routing portion 12 is electrically connected directly or indirectly to the first electrical connection target 511 on the side of the vehicle body 510.

The second routing portion 12 may be directly or indirectly fixed to the vehicle body 510, and may not be fixed to the vehicle body 510 as described above. In a case where the second routing portion 12 is fixed to the side of the vehicle body 510, for example, a harness fixing tool (hereinafter, referred to as a "first harness fixing tool") is used for the fixing (not illustrated). The first harness fixing tool is, for example, a clamp, a clip, or the like provided with respective holding shapes with respect to the second routing portion 12 and the vehicle body 510 or a component (for example, a portion formed in a flat plate shape) fixed to the vehicle body 510.

In addition, the third routing portion 13 is a portion of the harness body 10 that is routed closer to the side of the slide door 520 than the other end portion 612 of the first arm member 610 (FIGS. 1 to 11). In the harness body 10, the second connector 22 of the terminal of the third routing portion 13 is electrically connected directly or indirectly to the second electrical connection target 521.

The third routing portion 13 is fixed to a fixed portion 522 on the side of the slide door 520 provided between the terminal on the side of the second electrical connection target 521 and the end portion on the side of the first routing portion 11 not to cause relative displacement with respect to the slide door 520 (FIG. 1). The fixed portion 522 on the side of the slide door 520 may be a portion provided on the slide door 520 or a portion provided on another member fixed without relative displacement with respect to the slide door 520. The link mechanism 600 includes a harness fixing tool (hereinafter, referred to as a "second harness fixing tool") 30 that fixes a fixing portion 13a between the terminal of the third routing portion 13 on the side of the second electrical connection target 521 and the end portion on the side of the first routing portion 11 to the fixed portion 522 on the side of the slide door 520 (FIGS. 1, 2, 4, 5, 7, and 10). For example, the second harness fixing tool 30 is a clamp or a clip provided with respective holding shapes with respect to the fixed portion 522 such as a through hole provided in the fixing portion 13a of the third routing portion 13 and the slide door 520 (for example, a portion formed in a flat plate shape).

Furthermore, the link mechanism 600 includes a harness guide tool 40 that is fixed to the other end portion 612 of the first arm member 610 and regulates the routing path of the third routing portion 13 (FIGS. 1 to 11). The harness guide tool 40 is a guide member that guides the third routing portion 13 toward the fixed portion 522 on the side of the slide door 520 positioned in the direction intersecting the operation plane Pm of the link mechanism 600 with respect to itself. The harness guide tool 40 is fixed without relative displacement with respect to the other end portion 612 of the first arm member 610, and guides the third routing portion 13 from the end portion on the side of the first routing portion 11 toward the fixed portion 522 on the side of the slide door 520.

When the relative rotation position of the second arm member 620 about the axis of the third rotation shaft 651 with respect to the slide door 520 is the central position of the swing width Wθ of the third relative rotation, the fixed portion 522 on the side of the slide door 520 is provided on a plane (hereinafter, referred to as a "virtual plane") Pi where the axial center of each of the second rotation shaft 641 and the third rotation shaft 651 exists and in the direction intersecting the operation plane Pm of the link mechanism 600 with respect to the harness guide tool 40 (FIGS. 1 and 10).

Figure 2:
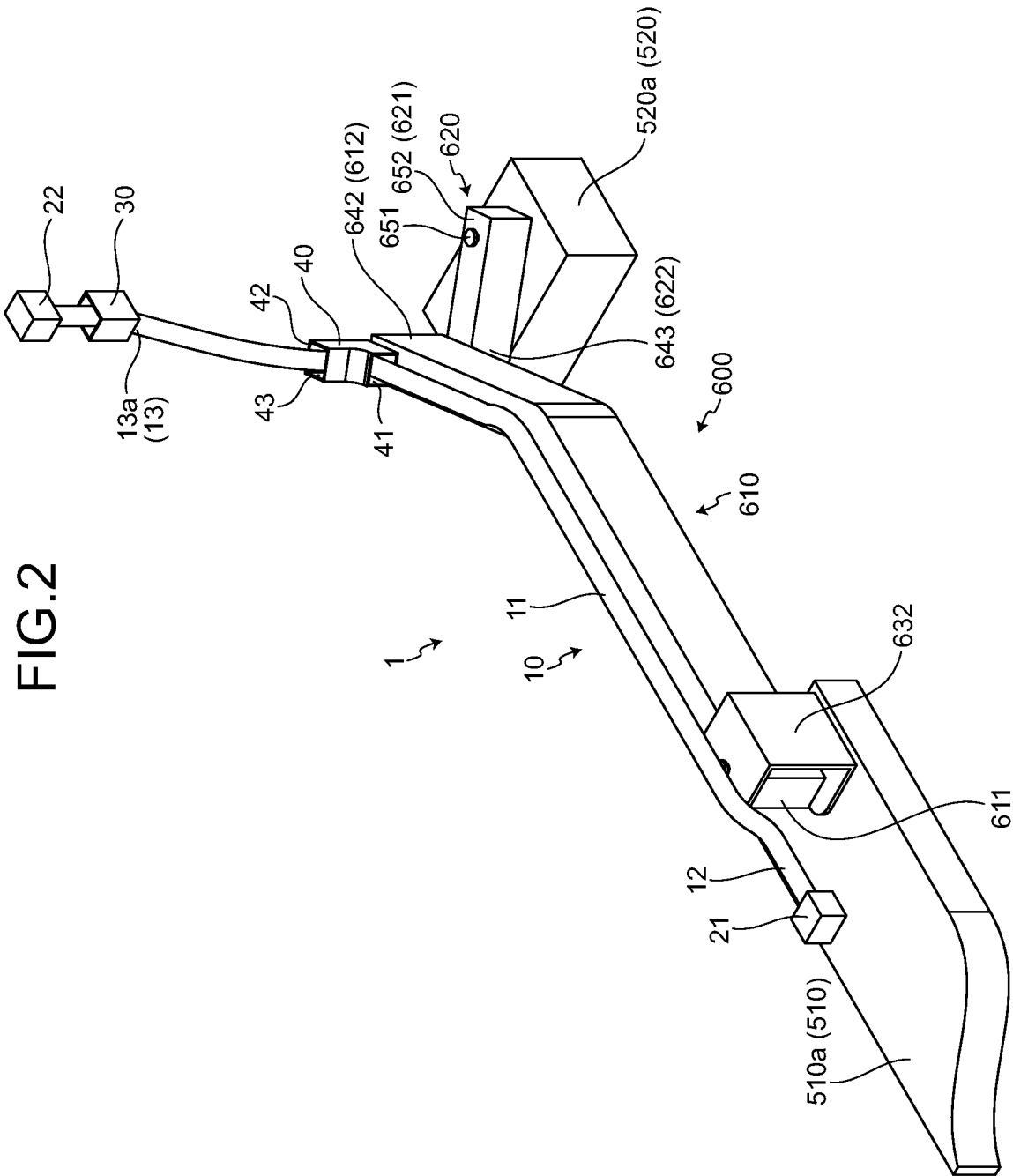
Figure 3:
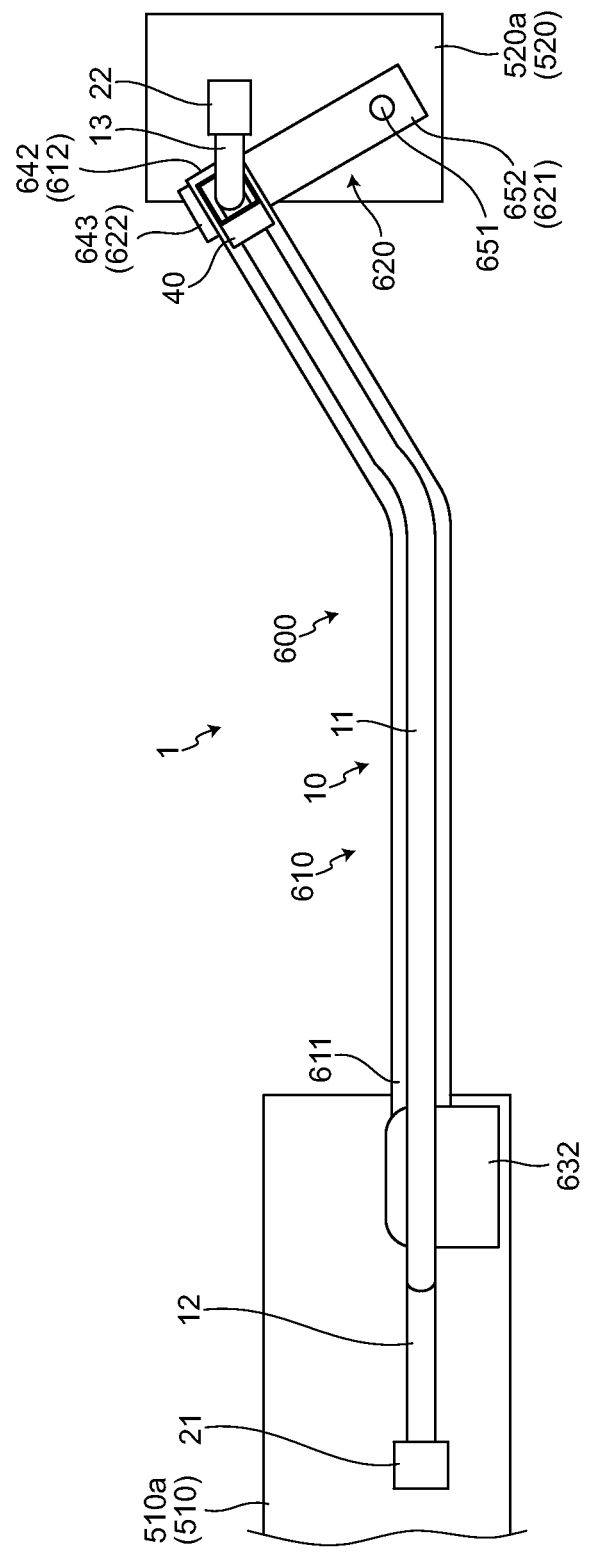

The harness guide tool 40 includes a pull-in port 41 through which the first routing portion 11 routed to the other end portion 612 of the first arm member 610 along the first arm member 610 is pulled, a pull-out port 42 through which the third routing portion 13 is pulled out and directed to the fixed portion 522 on the side of the slide door 520, and a guide space 43 that guides the first routing portion 11 pulled in from the pull-in port 41 and guides the third routing portion 13 to the pull-out port 42 (FIG. 2). A main body of the harness guide tool 40 illustrated here is formed in an L-shaped tubular shape, and its internal space is used as the L-shaped guide space 43 for guiding the first routing portion 11 and the third routing portion 13. Then, the harness guide tool 40 opens the pull-out port 42 in the axial direction of the first rotation shaft 631 and the second rotation shaft 641, and directs the third routing portion 13 toward the fixed portion 522 on the side of the slide door 520 existing beyond the pull-out port 42. For example, the harness guide tool 40 pulls out the third routing portion 13 on the axis of the second rotation shaft 641. Therefore, the pull-out port 42 is provided on the axis of the second rotation shaft 641, and the third routing portion 13 is pulled out on this axis.

The fixed portion 522 on the side of the slide door 520 is provided on the area in the upper side of the vehicle or the area on the lower side of the vehicle with respect to the harness guide tool 40. For example, when the relative rotation position of the second arm member 620 about the axis of the third rotation shaft 651 with respect to the slide door 520 is the central position of the swing width Wθ of the third relative rotation, the fixed portion 522 is provided in the area on the upper side of the vehicle or the area on the lower side of the vehicle with respect to the harness guide tool 40. The fixed portion 522 illustrated here is provided in the area on the upper side of the vehicle with respect to the harness guide tool 40 when the second arm member 620 is at its central position. Specifically, when the second arm member 620 is at the central position of the swing width Wθ of the third relative rotation, the fixed portion 522 is provided in the area on the upper side of the vehicle with respect to the harness guide tool 40 and at a position where the fixing portion 13a of the third routing portion 13 arranged on the upper side of the vehicle with respect to the harness guide tool 40 can be fixed by the second harness fixing tool 30. For example, when the second arm member 620 is at the central position of the swing width Wθ of the third relative rotation, the third routing portion 13 is pulled out from the pull-out port 42 of the harness guide tool 40 to the upper side of the vehicle, and the fixing portion 13a positioned on the upper side of the vehicle than the pull-out port 42 is fixed to the fixed portion 522 on the side of the slide door 520 by the second harness fixing tool 30.

In the third routing portion 13, an end portion on the side of the first routing portion 11 is constrained at an arrangement place of the harness guide tool 40 that follows the movement and position of the first arm member 610, and the fixing portion 13a is constrained at a position of the fixed portion 522 on the side of the slide door 520. Therefore, in the third routing portion 13, when the second arm member 620 is relatively rotated about the axis of the third rotation shaft 651 with respect to the slide door 520, the harness guide tool 40 moves in conjunction with the displacement of the other end portion 622 of the second arm member 620 (the other end portion 612 of the first arm member 610) with respect to the position of the fixed portion 522 on the side of the slide door 520, in a manner that it is possible to bend and deform the harness guide tool 40 and the fixing portion 13a while suppressing the deformation amount following the displacement of the harness guide tool 40 (FIGS. 9 and 10). That is, the wire harness 1 can cause the harness body 10 to follow the movement of the link mechanism 600 without overload.

Specifically, since the fixed portion 522 on the side of the slide door 520 is provided on the virtual plane Pi and in the direction intersecting the operation plane Pm of the link mechanism 600 with respect to the harness guide tool 40, the third routing portion 13 can bend and deform the second arm member 620 with the same deformation amount when the second arm member 620 is relatively rotated from the central position of the swing width WO of the third relative rotation to one end about the axis of the third rotation shaft 651 with respect to the slide door 520 and when the second arm member 620 is relatively rotated from the central position of the swing width Wθ to the other end. Therefore, the wire harness 1 can minimize the bending deformation amount of the third routing portion 13 when the second arm member 620 is relatively rotated about the axis of the third rotation shaft 651 with respect to the slide door 520. Therefore, the wire harness 1 can cause the harness body 10 to follow the movement of the link mechanism 600 without overload when the link mechanism 600 performs the third relative rotation.

In addition, in the third routing portion 13, when the first arm member 610 and the second arm member 620 are relatively rotated about the axis of the second rotation shaft 641 with respect to each other, the first routing portion 11 rotates about the axis of the third routing portion 13 in conjunction with the movement of the first arm member 610, and thus, it is possible to suppress the deformation amount between the harness guide tool 40 and the fixing portion 13a and to twist and deform about its own axis (FIG. 11). That is, the wire harness 1 can cause the harness body 10 to follow the movement of the link mechanism 600 without overload.

Specifically, since the third routing portion 13 is pulled out from the harness guide tool 40 on the axis of the second rotation shaft 641, the third routing portion 13 can be twisted and deformed on the axis of the second rotation shaft 641 or in the vicinity of the axis of the second rotation shaft 641. Therefore, the third routing portion 13 can be twisted and deformed with a reduced deformation amount as compared with a case where the third routing portion 13 is pulled out from the harness guide tool 40 at a position away from the axis of the second rotation shaft 641. Therefore, in the wire harness 1, the harness body 10 can follow the movement of the link mechanism 600 without overload when the first arm member 610 and the second arm member 620 are relatively rotated about the axis of the second rotation shaft 641 with respect to each other.

Incidentally, the second arm member 620 illustrated here extends in the vehicle width direction and arranges the second rotation shaft 641 and the third rotation shaft 651 in the vehicle width direction when the relative rotation position about the axis of the third rotation shaft 651 with respect to the slide door 520 is the central position of the swing width Wθ of the third relative rotation. Therefore, the virtual plane Pi illustrated here is a plane along the vehicle width direction and the vehicle up-down direction and orthogonal to the vehicle front-rear direction (sliding direction) when the second arm member 620 is at its central position. Note that the second arm member 620 relatively rotates from the central position of the swing width Wθ of the third relative rotation to one end side and the other end side of the swing width Wθ about the axis of the third rotation shaft 651 with respect to the slide door 520 at the same angle.

As described above, since the wire harness 1 of the present embodiment can cause the harness body 10 to follow the movement of the link mechanism 600 without overload, the durability of the harness body 10 can be improved.

In the wire harness according to the present invention, in the third routing portion, an end portion on the side of the first routing portion is constrained at an arrangement place of the harness guide tool that follows the movement and position of the first arm member, and the fixing portion is constrained at a position of the fixed portion on the side of the slide door. Therefore, when the second arm member is relatively rotated about the axis of the third rotation shaft with respect to the slide door, the third routing portion can be bent and deformed while suppressing the amount of deformation between the harness guide tool and the fixing portion. In addition, in the third routing portion, when the first arm member and the second arm member are relatively rotated about the axis of the second rotation shaft with respect to each other, it is possible to suppress the deformation amount between the harness guide tool and the fixing portion and to twist and deform about its own axis. That is, since the wire harness according to the present invention can deform the third routing portion in accordance with the movement of the link mechanism, the harness body can follow the movement of the link mechanism without overload.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A wire harness comprising:
   a harness body having a first routing portion routed in a link mechanism that couples a vehicle body and a slide door and reciprocates the slide door in a sliding direction with respect to the vehicle body, a second routing portion routed closer to a side of the vehicle body than the first routing portion, and a third routing portion routed closer to a side of the slide door than the first routing portion;
   a harness fixing tool that fixes a fixing portion of the third routing portion to a fixed portion on the side of the slide door provided not to cause relative displacement with respect to the slide door; and
   a harness guide tool that regulates a routing path of the third routing portion, wherein
   the link mechanism includes a first arm member having one end portion coupled to the side of the vehicle body and the first routing portion routed to an other end portion, a second arm member having one end portion connected to the side of the slide door, a first rotation shaft having a direction orthogonal to the sliding direction as an axial direction and capable of first relative rotation between the vehicle body and the one end portion of the first arm member, a second rotation shaft parallel to the first rotation shaft and capable of second relative rotation between the other end portion of the first arm member to which the harness guide tool is fixed and an other end portion of the second arm member, and a third rotation shaft parallel to the first rotation shaft and the second rotation shaft and capable of third relative rotation between the slide door and the one end portion of the second arm member, in which the slide door reciprocates in the sliding direction with respect to the vehicle body along a plane orthogonal to the first rotation shaft, the second rotation shaft, and the third rotation shaft,
   the harness guide tool guides the third routing portion toward the fixed portion on the side of the slide door positioned in a direction intersecting the orthogonal plane with respect to the harness guide tool, and
   the third routing portion is bent and deformed between the harness guide tool and the fixing portion when the second arm member is relatively rotated about an axis of the third rotation shaft with respect to the slide door, and is twisted and deformed about its own axis between the harness guide tool and the fixing portion when the first arm member and the second arm member are relatively rotated about an axis of the second rotation shaft with respect to each other.

2. The wire harness according to claim 1, wherein the fixed portion on the side of the slide door is provided in an area on an upper side of a vehicle or an area on a lower side of a vehicle with respect to the harness guide tool.

3. The wire harness according to claim 1, wherein the link mechanism relatively rotates the second arm member about the axis of the third rotation shaft with respect to the slide door within a swing width range, and
   the link mechanism, when moving the slide door at a fully closed position to a fully opened position, relatively rotates the first arm member about an axis of the first rotation shaft with respect to the vehicle body, and relatively rotates the second arm member positioned at one end of the swing width with respect to the slide door about the axis of the third rotation shaft with respect to the slide door while relatively rotating the second arm member about the axis of the second rotation shaft with respect to the first arm member in a manner that the second arm member reaches the other end of the swing width with respect to the slide door, and relatively rotates the first arm member about the axis of the second rotation shaft with respect to the second arm member while continuing the relative rotation of the first arm member about the axis of the first rotation shaft with respect to the vehicle body and keeping the second arm member positioned at the other end of the swing width respect to the slide door.

4. The wire harness according to claim 2, wherein the link mechanism relatively rotates the second arm member about the axis of the third rotation shaft with respect to the slide door within a swing width range, and
   the link mechanism, when moving the slide door at a fully closed position to a fully opened position, relatively rotates the first arm member about an axis of the first rotation shaft with respect to the vehicle body, and relatively rotates the second arm member positioned at one end of the swing width with respect to the slide door about the axis of the third rotation shaft with respect to the slide door while relatively rotating the second arm member about the axis of the second rotation shaft with respect to the first arm member in a manner that the second arm member reaches the other end of the swing width with respect to the slide door, and relatively rotates the first arm member about the axis of the second rotation shaft with respect to the second arm member while continuing the relative rotation of the first arm member about the axis of the first rotation shaft with respect to the vehicle body and keeping the second arm member positioned at the other end of the swing width respect to the slide door.

* * * * *